(12) United States Patent
Savicki, Jr. et al.

(10) Patent No.: US 7,026,564 B1
(45) Date of Patent: Apr. 11, 2006

(54) PADDLE SWITCH ASSEMBLY

(75) Inventors: Gerald R. Savicki, Jr., Canastota, NY (US); Benjamin Coley, Vimont (CA); Francois Duval, Terrebonne (CA); Gad Shaanan, La Jolla, CA (US)

(73) Assignee: Pass & Seymour/LeGrand, Syracuse, NY (US)

( * ) Notice: Subject to any disclaimer, the term of this patent is extended or adjusted under 35 U.S.C. 154(b) by 0 days.

(21) Appl. No.: 10/765,636

(22) Filed: Jan. 27, 2004

(51) Int. Cl.
*H01H 3/00* (2006.01)

(52) U.S. Cl. ...................... 200/339; 200/315
(58) Field of Classification Search ............... 200/339, 200/315, 293, 529, 553
See application file for complete search history.

(56) References Cited

U.S. PATENT DOCUMENTS

| | | | | |
|---|---|---|---|---|
| 3,562,468 A | * | 2/1971 | Stefani | 200/295 |
| 3,651,296 A | * | 3/1972 | Yarbrough | 200/315 |
| 3,770,920 A | * | 11/1973 | Poliak | 200/457 |
| 4,221,941 A | * | 9/1980 | Genovese | 200/457 |
| 4,242,552 A | * | 12/1980 | Tibolla | 200/339 |
| 4,857,669 A | * | 8/1989 | Kitamura et al. | 174/53 |
| 5,068,639 A | * | 11/1991 | Swanson et al. | 338/179 |
| 5,343,007 A | * | 8/1994 | Roeser et al. | 200/296 |
| 5,382,768 A | * | 1/1995 | Kurek et al. | 200/556 |
| 5,384,441 A | * | 1/1995 | Balaban et al. | 200/339 |
| 5,451,729 A | * | 9/1995 | Onderka et al. | 200/18 |
| 5,500,498 A | * | 3/1996 | Kurek et al. | 200/556 |
| 5,595,289 A | * | 1/1997 | Kurek et al. | 200/559 |
| 5,630,502 A | * | 5/1997 | Kurek et al. | 200/559 |
| 5,712,450 A | * | 1/1998 | Chan et al. | 174/66 |
| 5,749,459 A | * | 5/1998 | Balaban et al. | 200/559 |
| 5,803,243 A | * | 9/1998 | Nestor et al. | 200/556 |
| 5,810,109 A | * | 9/1998 | Chu | 200/308 |
| 5,826,710 A | * | 10/1998 | Kurek et al. | 200/559 |
| 5,836,869 A | | 11/1998 | Kudo et al. | |
| 5,865,303 A | * | 2/1999 | Gernhardt et al. | 200/557 |
| 5,906,272 A | * | 5/1999 | Kurek | 200/559 |
| 5,990,436 A | * | 11/1999 | Balaban et al. | 200/559 |
| 6,033,415 A | | 3/2000 | Mittelstadt et al. | |
| 6,255,610 B1 | * | 7/2001 | Botz et al. | 200/315 |

(Continued)

FOREIGN PATENT DOCUMENTS

DE 4028619 * 3/1992

(Continued)

OTHER PUBLICATIONS

Surgical Exposures in Orthopaedics, The Anatomic Approach, 2$^{nd}$ Edition, by Stanley Hoppenfeld and Piet DeBoer.

*Primary Examiner*—Michael Friedhofer
*Assistant Examiner*—Lisa Klaus
(74) *Attorney, Agent, or Firm*—William Greener; Bond, Schoeneck & King, PLLC

(57) ABSTRACT

A rocker switch assembly includes a switch body, a mounting strap, a frame, and a paddle for actuating the switch between an on and an off position. The paddle has a uni-convex cylindrical exterior surface. The rocker switch assembly further includes a faceplate in the form of a frame having an opening. The exterior front surface of the faceplate has a uni-convex cylindrical surface profile. In an assembled condition, the paddle substantially occupies the faceplate opening. Due to the selected convex shapes of the paddle and faceplate, a portion of the paddle front surface is always substantially flush with a portion of the faceplate surface and at no time does any part of the paddle surface protrude past the faceplate front surface.

10 Claims, 5 Drawing Sheets

U.S. PATENT DOCUMENTS

| | | | |
|---|---|---|---|
| 6,339,201 B1 * | 1/2002 | Balaban et al. | 200/339 |
| 6,380,500 B1 * | 4/2002 | Lin | 200/302.3 |
| 6,384,654 B1 * | 5/2002 | Noufer | 327/276 |
| 6,468,202 B1 | 10/2002 | Irion et al. | |
| 6,621,025 B1 * | 9/2003 | Yei et al. | 200/315 |
| 6,657,144 B1 * | 12/2003 | Savicki et al. | 200/296 |
| 6,717,085 B1 * | 4/2004 | Wang | 200/520 |
| 6,720,512 B1 * | 4/2004 | Rothbauer et al. | 200/330 |
| 6,833,521 B1 * | 12/2004 | Nishikawa | 200/339 |
| 6,875,940 B1 * | 4/2005 | Endres et al. | 200/339 |
| 6,891,117 B1 * | 5/2005 | Gouhl et al. | 200/339 |
| 6,903,292 B1 * | 6/2005 | Balaban et al. | 200/339 |

FOREIGN PATENT DOCUMENTS

| | | |
|---|---|---|
| DE | 194 41 500 A1 | 5/1997 |
| EP | 0 391 376 A1 | 10/1990 |

\* cited by examiner

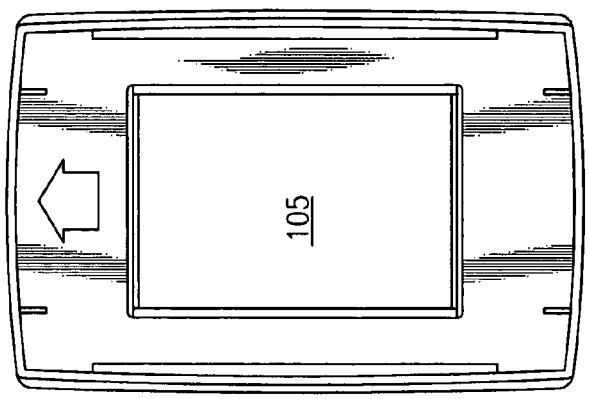
FIG.6F
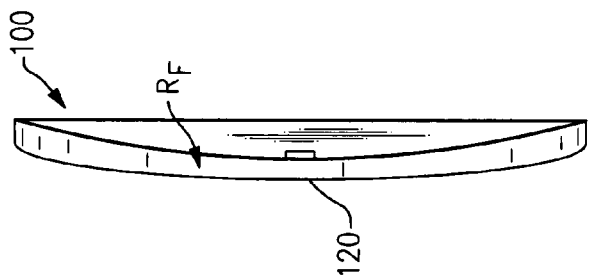
FIG.6E
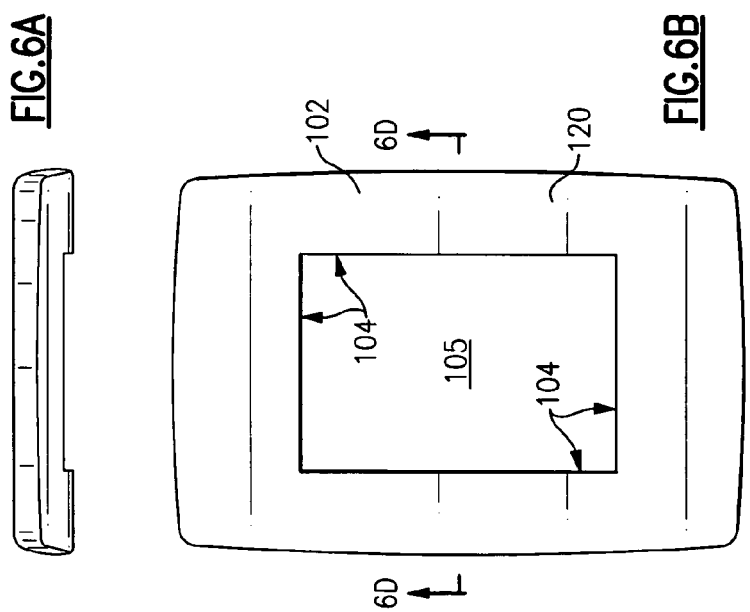
FIG.6A
FIG.6B
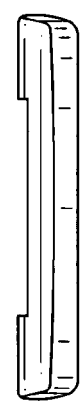
FIG.6C
FIG.6D

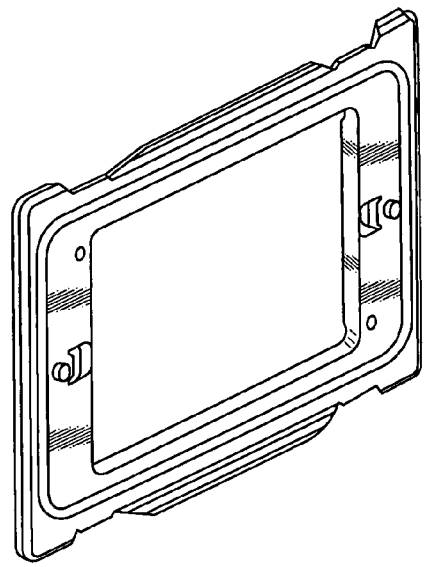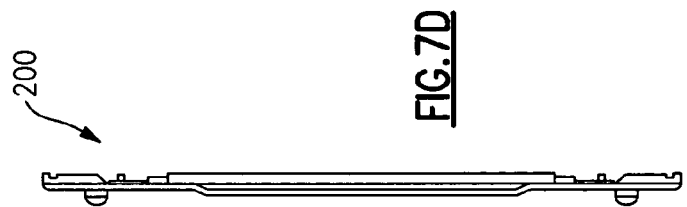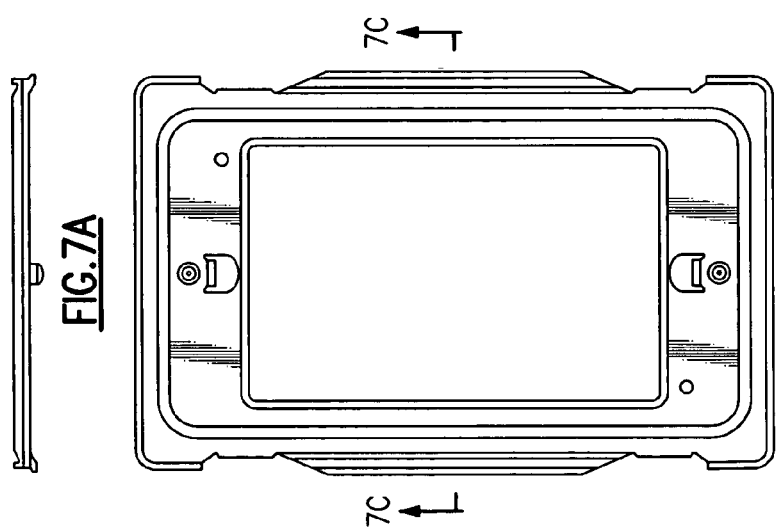

PADDLE SWITCH ASSEMBLY

BACKGROUND OF THE INVENTION

1. Field of the Invention

Embodiments of the invention are generally directed to an electrical switch assembly and, more particularly, to a wall-mounted switch assembly having a contoured paddle and a correspondingly contoured faceplate.

2. Description of Related Art

Rocker switch assemblies are well known in the art especially in terms of internal components for actuating a single pole or three-way wall-mounted residential switch, for example. From a cosmetic point of view, the rocker or paddle as it is often referred to, for actuating the switch connection, generally has a concave style shape in the longitudinal direction resembling a shallow saucer, or two generally flat regions inclined inwardly to form the shape of a shallow V. Presumably, the generally concave shape of the paddle presents an ergonomic design lending itself to ease of manipulation for turning the switch on and off.

Although the design styles of the rocker switch assemblies described herein above are entirely satisfactory from a functional standpoint, they may not provide an appearance that is architecturally compatible with certain design or decorating trends in commercial and/or residential buildings.

Accordingly, the inventor has recognized that an alternative rocker switch assembly design may fill a gap in the commercially available array of products.

SUMMARY OF THE INVENTION

An embodiment of the invention is directed to a rocker switch assembly that includes a switch body having switch contacts, a mounting strap engaged with the switch body, a frame attached to the switch body, and a paddle for actuating the switch between an on and an off position. According to the embodiment, the paddle has a pivot structure on a side surface thereof that cooperatively engages a corresponding structure on the frame to provide a pivoting motion of the paddle in the longitudinal direction upon external pressure being applied to the paddle surface. The paddle also includes one or more portions that cooperatively engage with the frame to limit the range of pivotal motion of the paddle between a forwardly tilted position and a rearwardly tilted position. The paddle further includes a structure that opens and closes the electrical contacts of the switch body depending upon the forwardly tilted or rearwardly tilted position of the paddle. The paddle has a uni-convex cylindrical exterior surface having a curvature, $R_p$. The paddle further has a contiguous circumferential surface including opposing side portions and opposing upper and lower portions wherein the upper and lower portions have a transverse (cross sectional) profile defined by a curvature, $R_B$, the center of which lies along a pivot axis of the paddle.

In an aspect of the embodiment, the rocker switch assembly further includes a faceplate in the form of a frame having an opening, the perimeter of which is defined by upper and opposing lower inner surfaces and left and opposing right inner surfaces. The exterior front surface of the faceplate has a uni-convex cylindrical surface profile having a curvature, $R_f$. An axial centerline of the faceplate opening intersects an axial centerline of the paddle at a constant location along the pivot axis. Both the upper and opposing lower inner surfaces of the faceplate opening perimeter have a transverse (cross sectional) curvature defined by a radius of curvature, $R_A$, the center of which is the same as the origin of $R_B$.

In an assembled condition, the paddle substantially occupies the faceplate opening. Due to the selected radii of curvatures $R_p$ and $R_f$, a portion of the longitudinal cross sectional profile of the paddle will be substantially tangent to a corresponding portion of a cross sectional profile of the faceplate surface when the paddle is either in the forwardly tilted position or the rearwardly tilted position. That is to say, at least a portion of the paddle front surface is always substantially flush with a portion of the faceplate surface and at no time does any part of the paddle surface protrude past the faceplate front surface. The tolerances between the perimeter paddle surfaces and inner perimeter faceplate surfaces provided by the radii of curvature $R_B$ and $R_A$ and their common origin contribute to the flush operational engagement between the paddle and the faceplate.

BRIEF DESCRIPTION OF THE DRAWINGS

FIGS. 6(a–f) are various views of the faceplate shown in FIG. 7; and

FIGS. 7(a–f) are various views of a sub plate component of a rocker switch assembly used in conjunction with the faceplate component of FIG. 7 according to an embodiment of the invention.

DETAILED DESCRIPTION OF A PREFERRED EMBODIMENT OF THE INVENTION

Figure 1:
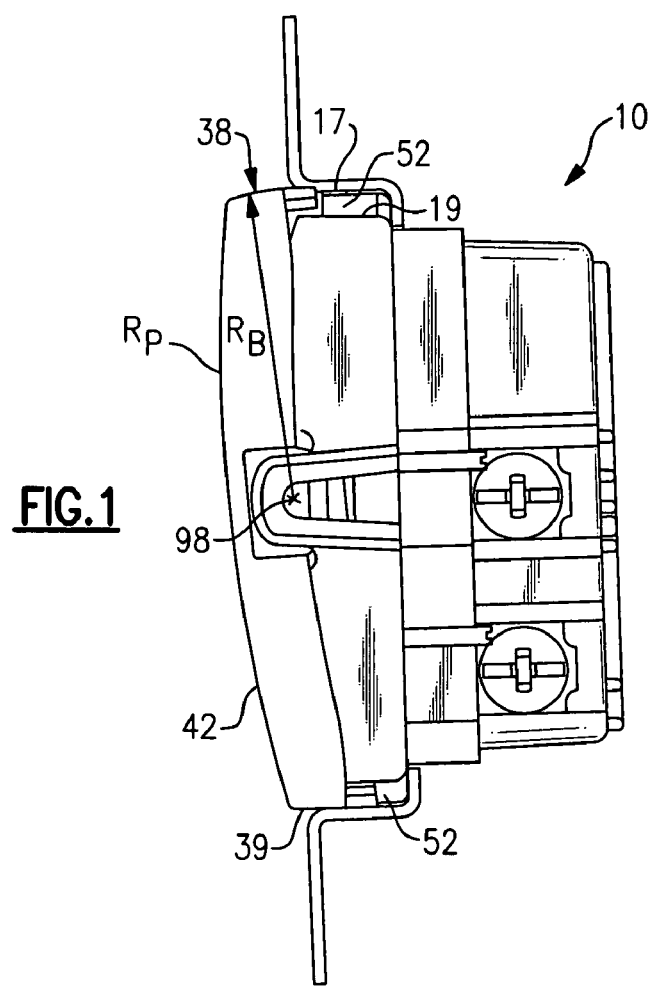
FIG. 1 is a side elevation view of a rocker switch assembly according to an embodiment of the invention.
Figure 2:
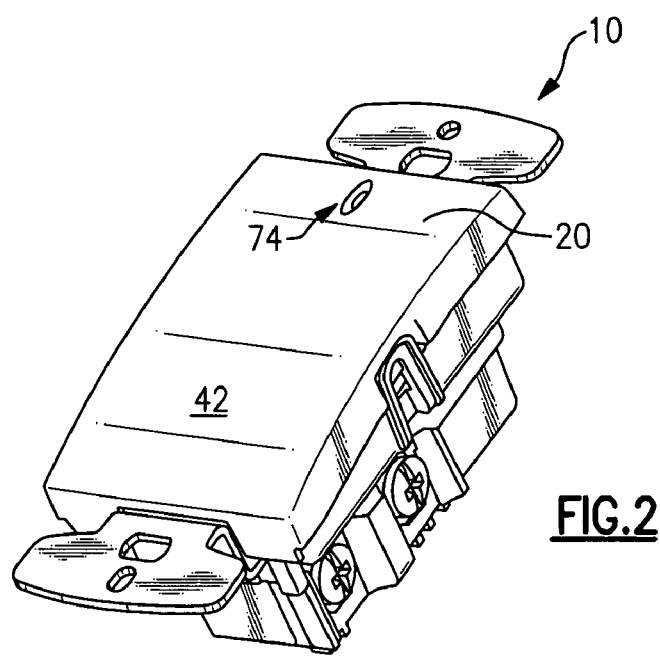
FIG. 2 is a schematic perspective view of a rocker switch assembly according to an embodiment of the invention.
Figure 3:
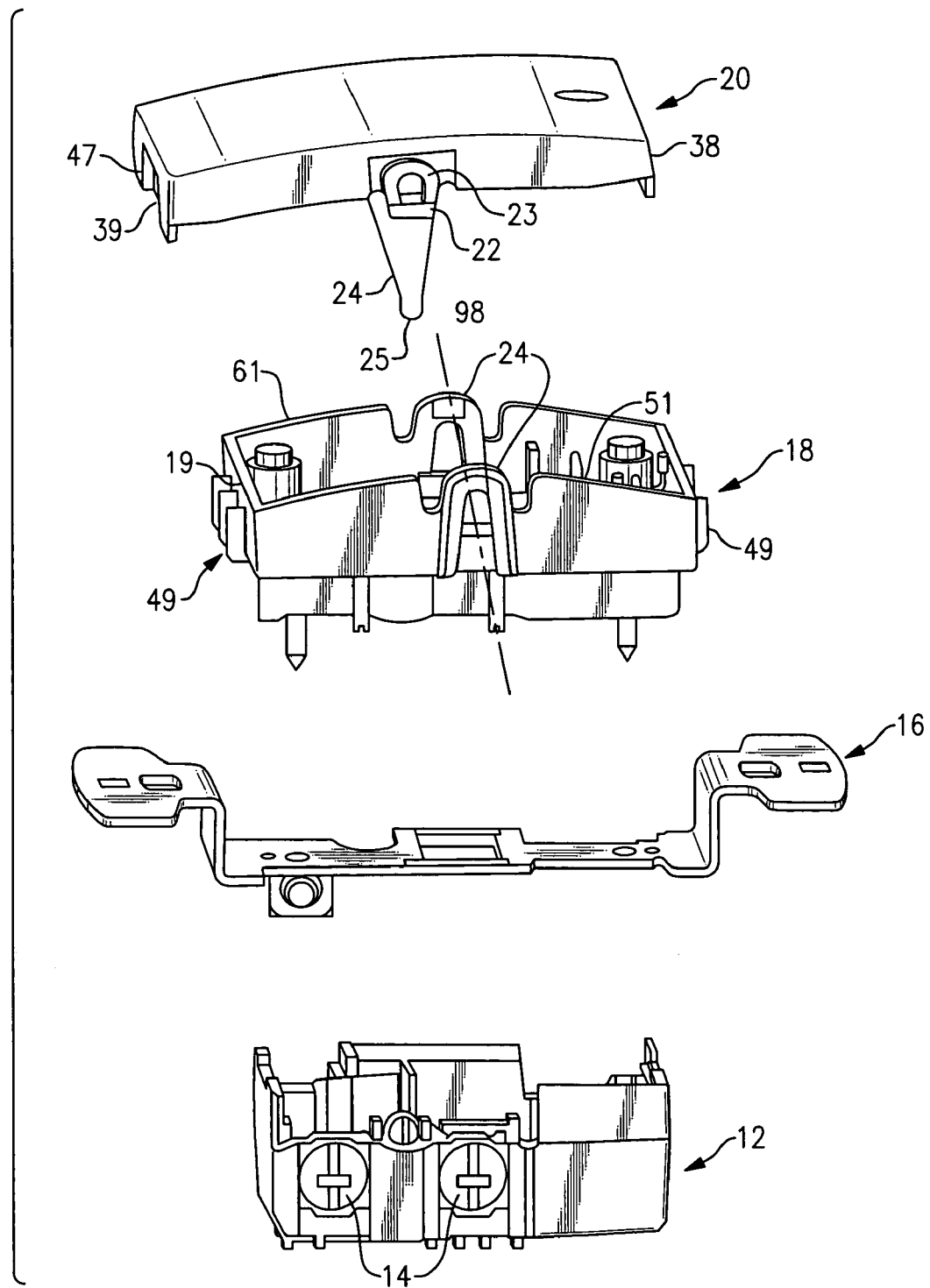
FIG. 3 is an exploded schematic view of a rocker switch assembly according to an embodiment of the invention.
Figure 4A:
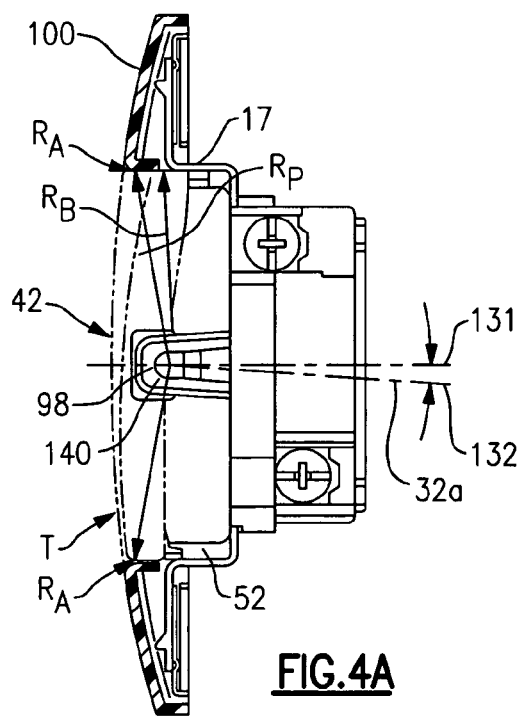
FIG. 4A is a side-elevational view partly in cross section of a rocker switch assembly according to an embodiment of the invention.
Figure 4B:
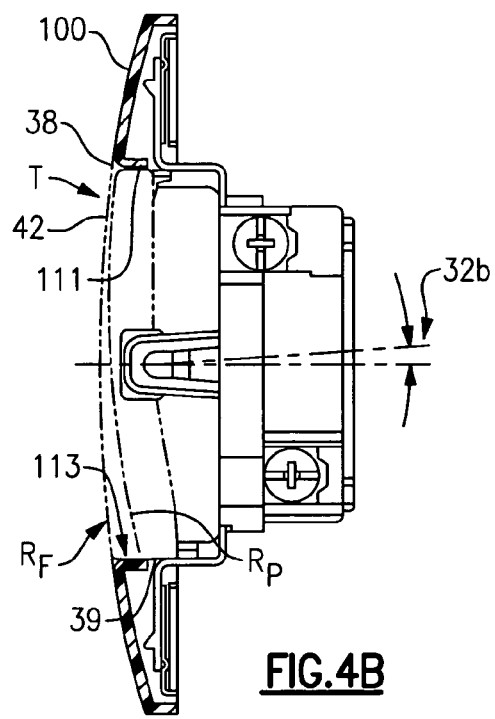
FIG. 4B shows the assembly of FIG. 1A with the paddle component in a different switch position.
Figure 5:
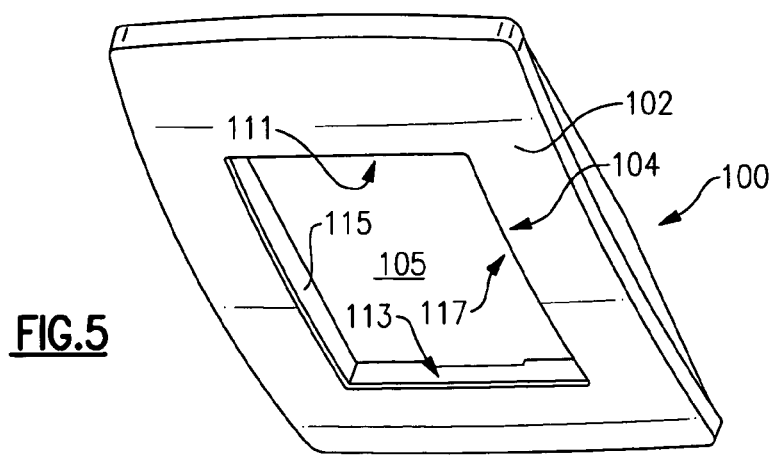
FIG. 5 is a schematic perspective view of a faceplate component of the rocker switch assembly according to an embodiment of the invention.

An embodiment of the invention is directed to a rocker switch assembly 10 as illustrated in FIGS. 1 and 2. Referring to FIG. 3, the rocker switch assembly includes a switch body 12 including switch contacts 14, a mounting strap 16 that engages the switch body, a frame 18 attached to the switch body, and a paddle 20 including an actuating arm 24 for enabling or disabling the switch contacts. The paddle 20 includes a pivot structure 22 on a lateral side surface thereof in the form of a rounded knob 23 that cooperatively engages a portion of the frame and provides quasi-rotational movement of the paddle about a pivot axis 98. The paddle further includes a switch actuating structure 24 integrally attached to a rear surface of the paddle. The actuating structure has a distal end 25 that operationally enables an open-switch condition and a closed-switch condition. Top lateral surface 38 and bottom lateral surface 39 of the paddle 20 each include a slot 47 that cooperatively engages a surface ridge 49 on the frame to limit the rotational motion of the paddle between a fixed forwardly tilted position represented by 32a in FIG. 4A and a fixed rearwardly tilted position as illustrated by 32b in FIG. 4B. The paddle has a front surface 42 having a generally convex longitudinal profile with a curvature defined by $R_p$ as illustrated in FIGS. 1 and 4. More particularly, the paddle has a uni-convex cylindrical exterior surface; i.e., it has a convex longitudinal profile and a flat transverse profile. As shown in FIG. 3, the side edges 51, 61 of the frame 18 have a similarly shaped profile.

The upper and lower lateral surfaces 38, 39 of the paddle 20, also referred to herein as the upper and lower circumferential surfaces of the paddle, each have a curvature of radius $R_B$ as shown in FIGS. 1 and 4A. The radius $R_B$ originates along the pivot axis 98 of the paddle. As further shown in FIGS. 1 and 4, in an assembled condition, the circumferential surfaces 38, 39 of the paddle 20 engage a space 52 between a portion 17 of the mounting strap 16 and a surface 19 of the frame 18 when the paddle is forwardly and rearwardly tilted.

According to an aspect of the embodiment as illustrated in FIG. 2, the paddle includes an indicia 74 that aides in recognition of switch status. For example, indicia 74 may be an indentation in the front surface 42 of the paddle that provides a tactile sensation to a user when operating the switch assembly. Alternatively, the indicia 74 may include a lens/LED combination that makes contact with an internal receptacle such that the indicia becomes illuminated when the switch is in either the on position or the off position. Various embodiments of an illuminated paddle are described in U.S. patent application Ser. No. 10/726,173 filed on Dec. 2, 2003, which is hereby incorporated by reference in its entirety to the fullest allowable extent. It will be appreciated that the instant invention, however, is not limited to the type or form of indicia described herein above.

Another embodiment according to the invention is directed to the rocker switch assembly 10 described above and further including a faceplate component 100 as illustrated, for example, in FIG. 7. The faceplate is in the form of a frame 102 having an opening 105 defined by the perimeter 104, including upper 111 and opposing lower 113 inner surfaces and left 115 and opposing right 117 inner surfaces. The faceplate 100, similar to the paddle, has an exterior front surface 120 having a uni-convex cylindrical exterior shape with a curvature $R_f$ as further illustrated in FIGS. 4B and 6E. According to an aspect of the embodiment, the curvature $R_f$ is not equal to the paddle curvature $R_p$.

FIGS. 6A–F and 7A–F show an exemplary embodiment of a faceplate component 100 and a sub-plate component 200 that provide a screwless or otherwise invisible attachment of the faceplate 100 to the switch assembly 10. Screwless faceplate components and assembly are described in U.S. application Ser. No. 10/723,202, which is hereby incorporated by referenced in its entirety to the fullest applicable extent. It will be appreciated, however, that the instant invention is not limited to a screw less or otherwise invisible faceplate assembly design.

As illustrated in FIGS. 4A and 4B, the upper and lower inner surfaces 111, 113, respectively, of the faceplate opening perimeter 104 have a curvature, $R_A$, having a radius origin along the pivot axis 98 coincident with the radius origin of the paddle edge curvature $R_B$. The common origin and radii values of the paddle and faceplate lateral surface curvatures provide consistent clearances between the paddle and the wall plate throughout the range of switching positions.

In an assembled condition, illustrated with the faceplate in cross section in FIGS. 4A and 4B, it can be seen that the centerline 131 of the faceplate opening 104 intersects the centerline 132 of the paddle at a constant intersection point 140 along the pivot axis 98. Due to the curvature values $R_p$ and $R_f$ of the paddle face 42 and the faceplate surface 120, respectively, at least a portion of the convex paddle profile is substantially tangent to a corresponding portion of the convex profile 120 of the faceplate surface, shown at T, when the paddle is either in the forwardly tilted position or the rearwardly tilted position. Based upon the contours of the paddle and the faceplate, and the limited rotational range of motion of the paddle, no portion of the paddle surface protrudes beyond the profile of the faceplate surface regardless of the paddle switch position.

The foregoing embodiments and aspects of the invention are disclosed herein by way of examples only and are not intended to limit the scope of the present invention, which is solely defined by the appended claims. A person of ordinary skill in the art will appreciate many variations and modifications within the scope of this invention.

The invention claimed is:

1. A rocker switch assembly, comprising:
   a switch body including switch contacts;
   a mounting strap engaged with the switch body;
   a frame attached to the switch body; and
   a paddle for actuating the switch contacts,
   wherein the paddle has a pivot structure cooperatively engageable with a portion of the frame for selective rotational movement around a pivot axis between a limited forwardly-tilted position and a limited rearwardly-tilted position, further wherein the paddle has a uni-convex cylindrical exterior surface with a curvature, Rp, wherein the paddle has an upper and lower surface, further wherein one of the upper and the lower circumferential surfaces engages a space intermediate a portion of the mounting strap and a surface of the frame in one the forwardly-tilted position and the rearwardly-tilted position.

2. The switch assembly of claim 1, wherein the paddle has an actuating structure integrally attached to a rear surface thereof having a distal end that operationally enables an open-switch condition and a closed-switch condition.

3. The switch assembly of claim 1, wherein the upper and lower circumferential surfaces each have a curvature, $R_B$, the center of which originates along the pivot axis.

4. The switch assembly of claim 1, wherein the paddle includes an indicia for identifying one of a position of the paddle and an indication of the switch status.

5. The switch assembly of claim 4, wherein the indicia is a surface indent.

6. The switch assembly of claim 1, further comprising:
   a faceplate in the form of a frame having an opening perimeter defined by upper and opposing lower inner surfaces and left and opposing right inner surfaces, wherein the faceplate has a uni-convex cylindrical exterior front surface with a curvature, $R_f$.

7. The switch assembly of claim 6, wherein the paddle substantially occupies the faceplate opening in an assembled condition, further wherein a portion of the convex profile of the paddle surface is substantially tangent to a corresponding portion of a convex cross sectional profile of the faceplate surface when the paddle is in one of the forwardly-tilted position and the rearwardly-tilted position,
   whereby no portion of the paddle surface extends beyond the faceplate surface.

8. The switch assembly of claim 6, wherein an axial centerline of the faceplate opening and an axial centerline of the paddle have a constant intersection point along the pivot axis.

9. The switch assembly of claim 8, wherein the paddle includes an upper and a lower circumferential surface having a curvature, $R_B$, the center of which originates along the pivot axis, further wherein the upper and opposing lower inner surfaces of the faceplate opening perimeter have a curvature, $R_A$, the center of which originates along the pivot axis.

10. The switch assembly of claim 9, wherein $R_b = R_A$.

* * * * *